United States Patent [19]
Braden et al.

[11] Patent Number: 5,433,863
[45] Date of Patent: Jul. 18, 1995

[54] METHOD FOR CLARIFYING WASTEWATER CONTAINING SURFACTANTS

[75] Inventors: Michael L. Braden; Robert A. Marble, both of Sugar Land, Tex.

[73] Assignee: Nalco Chemical Company, Naperville, Ill.

[21] Appl. No.: 153,649

[22] Filed: Nov. 17, 1993

[51] Int. Cl.$^6$ .............................................. B01D 17/05
[52] U.S. Cl. ...................... 210/708; 166/267; 208/188; 210/727; 210/730; 210/712; 252/338; 252/358
[58] Field of Search ................ 166/267; 208/187, 188; 210/708, 725, 727, 728, 730, 712; 252/338, 358

[56] References Cited

U.S. PATENT DOCUMENTS

| | | | |
|---|---|---|---|
| 4,558,080 | 12/1985 | Quamme et al. | 210/728 |
| 4,588,508 | 5/1986 | Allenson et al. | 210/708 |
| 4,781,839 | 11/1988 | Kelly et al. | 210/730 |
| 4,818,410 | 4/1989 | Bellos et al. | 210/708 |
| 5,045,212 | 9/1991 | Augustin et al. | 210/708 |
| 5,176,847 | 1/1993 | Kremer | 252/358 |
| 5,256,304 | 10/1993 | Meyer et al. | 210/730 |

FOREIGN PATENT DOCUMENTS

| | | |
|---|---|---|
| 50-155053 | 12/1975 | Japan . |
| 50-159148 | 12/1975 | Japan . |
| 52-009968 | 1/1977 | Japan . |
| 52-034547 | 3/1977 | Japan . |
| 52-061356 | 5/1977 | Japan . |
| 51-087347 | 7/1977 | Japan . |
| 52-115561 | 9/1977 | Japan . |
| 57-019084 | 2/1982 | Japan . |
| 62-227413 | 6/1987 | Japan . |
| 63-315192 | 12/1988 | Japan . |

OTHER PUBLICATIONS

Tomita, Shigeru, Yosui to Haisui (Japan) 28 (10), pp. 1024–1034 (1986) (abstract).

*Primary Examiner*—Peter A. Hruskoci
*Attorney, Agent, or Firm*—Robert A. Miller; James J. Drake

[57] ABSTRACT

A method and apparatus for recovering oil and clarifying waste water from an oil field are disclosed. The method includes the step of treating the waste water with an aqueous de-emulsifying agent comprising wattle tannin, an inorganic coagulant and a synthetic polymer flocculant to destabilize the oil emulsion and rapidly agglomerate the oil particles formed thereby. Efficiency of the present de-emulsifying agent permits use of flotation equipment for rapid clean-up of the waste water and obviates the need for large settling pits.

16 Claims, 1 Drawing Sheet

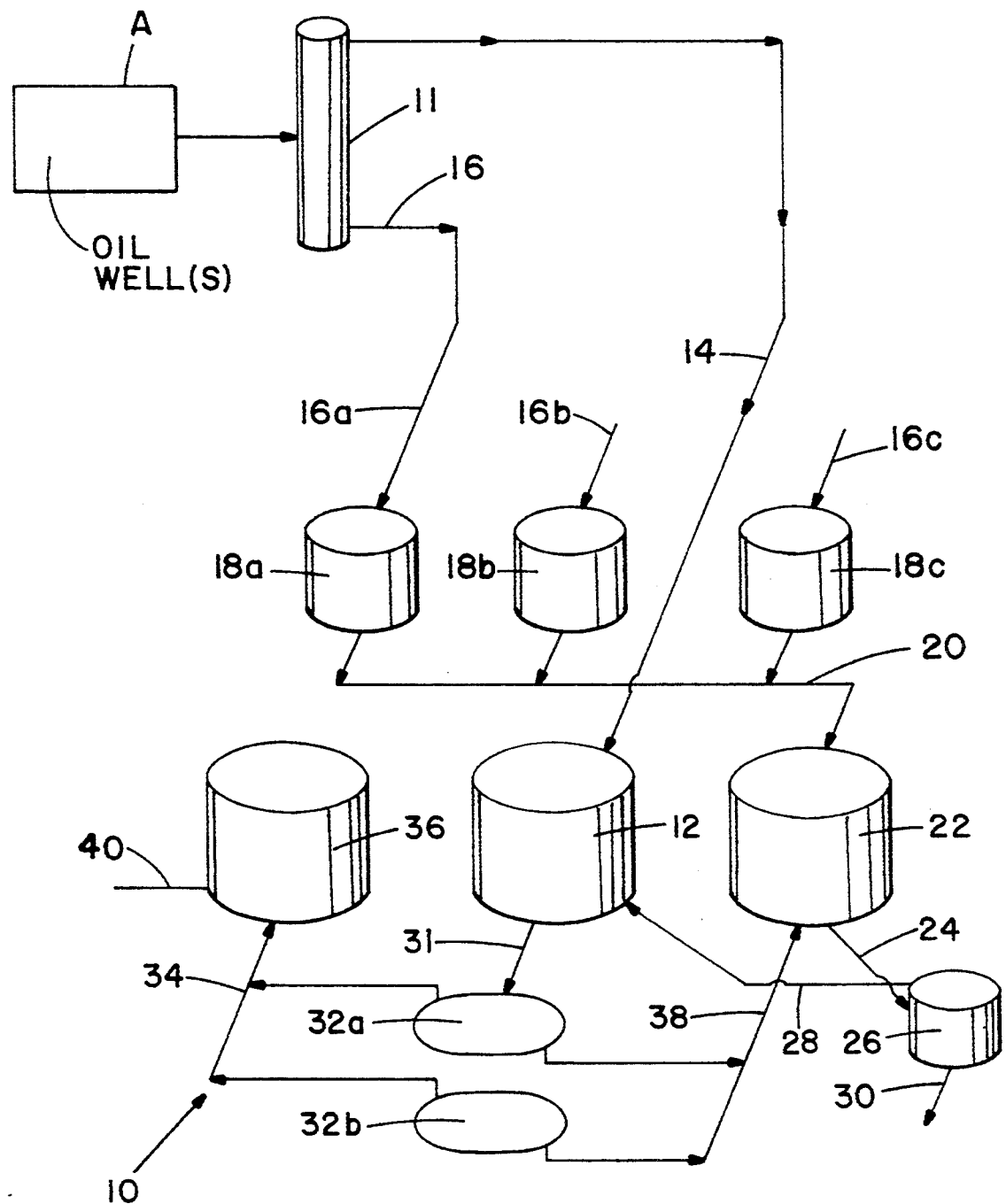

METHOD FOR CLARIFYING WASTEWATER CONTAINING SURFACTANTS

FIELD OF THE INVENTION

The present invention relates to a method for clarifying wastewater containing surfactants, and more particularly to such a method in petroleum production wherein oil emulsified in wastewater is recovered using a tannin.

BACKGROUND OF THE INVENTION

Water is typically recovered in petroleum production along with hydrocarbons from producing oil wells. Liquid produced in this manner typically will contain an oil phase, a water phase, and dispersed phases comprising water dispersed in the oil phase and oil dispersed in the water phase. The presence of water in the oil can adversely affect subsequent refining processes. To limit the formation of water-in-oil dispersions, a suitable water-in-oil emulsion breaking agent is generally used. Oil-in-water dispersions, on the other hand, are not generally considered a significant problem since the amount of oil dispersed is low and the wastewater is often reinjected into the formation after separation of the oil phase. However, efforts to limit adverse environmental impact of oil-containing wastewater have made water cleanup an important priority.

Emulsified oil contained in produced wastewater can be attributed to both natural and man-made surfactants. Petroleum comprises naturally occurring surfactant components such as naphthenic acids. Injected water will often contain a range of man-made surfactants including surfactants used for tertiary oil recovery and common drilling additives such as corrosion and scale inhibitors which can act as surfactants. In addition, the water-in-oil emulsion breakers mentioned above can also act as surfactants when used in excess as frequently happens. As a result, wastewater typically contains emulsified oil which is particularly stable and resistant to rapid clarification.

Water clarification is well known in the art. Various physical means have been used to remove particulate matter dispersed in a bulk liquid phase. Examples of common particulate separation techniques include filtration, settling, desalting, electrostatic precipitation, centrifugation, flotation, and the like. Such separation processes can often be made more efficient by the use of flocculating agents. Wastewater containing emulsified oil, however, can be difficult and inefficient to resolve by physical processes alone. In such circumstances, chemical agents can be used to break the emulsion. Once broken, coagulants and flocculants can be used to hasten agglomeration of the oil particles formed.

Tannins are astringent, water-soluble extracts from the bark, pods, leaves, fruit, etc. of various plants and trees. Tannins have best been known for preserving animal skin in the leather making process. Tannins and tannin-based products have also been reported in waste water treatment.

JP-62-227,413 6 Oct. 1987 describes the separation of oil emulsified with nonionic surfactants from wastewater wherein the wastewater is electrolyzed to separate oil from water following an addition of tannic acid.

JP-63-315,192 22 Dec. 1988 describes the purification of wastewater containing surfactant and/or oil using a polymer flocculant mixed with diatomaceous earth or kaolin powder impregnated with tannin.

Tomita, Shigeru, *Yosui to Haisui* (Japan) 28(10), pp. 1024–1034 (1986) describes the treatment of oily wastewater wherein tannic acid improved the electrolytic treatment of wastewater containing nonionic surfactant emulsified oil.

JP-57-019,084, 1 Feb. 1982 describes the treatment of wastewater by coagulation sedimentation using tannin to effectively remove water soluble polymeric substances such as polyoxyalkylene type surfactant, water soluble cellulose derivatives and polyvinyl alcohol.

JP-50-159,148, 23 Dec. 1975 describes the treatment of emulsified wastewater containing metals and oil by acidification in the presence of tannin or bisphenol-A, a chelating agent, a reducing agent and a metal collector such as a sulfide. The waste water is then flocculated with an inorganic flocculant to remove oils and metals.

JP-50-155,053, 14 Dec. 1975 describes the treatment of wastewater containing metal and emulsified oil by adding tannin, treating with an inorganic coagulant, separating the floc and alkalinizing to precipitate the metal.

JP-52-115,561, 28 Sep. 1977 describes the purification of industrial wastewater from a mining, smelting, metal processing plant, etc. by treatment with tannin extract and an optional coagulating agent to remove metal ions.

JP-52-034,547, 16 Mar. 1977 describes the treatment of waste water containing polyvinyl alcohol (PVA) by coagulation using a plant tannin and an inorganic cohesion agent such as an inorganic salt of aluminum, iron or copper. Flocs formed containing PVA and tannin are separated by filtration and calcination.

JP-52-009,968, 25 Jan. 1977 describes treating a wastewater containing surfactant by adding a metal salt of a condensed plant-type tannin or its formaldehyde condensate counterpart and an inorganic cohesive agent.

JP-51-087,347, 30 Jul. 1976 describes an emulsion treating process especially for emulsified wastewater containing surfactant and oil to which is added a condensed-type plant tannin and an inorganic cohesive agent to destroy the emulsion.

U.S. Pat. No. 5,1715,847 to Kremer describes a composition useful for demulsifying oil-in-water emulsions which comprises a water soluble mixture of a tannin or aminomethylated tannin, one or more cationic polymers and an alkoxylated triaminomethane or other polyfunctional amines or hydroxy compounds.

JP-52-061,356, 20 May 1977 describes a method for removing surfactant, oil and COD components from wastewater by treating with an alkali metal or ammonium salt of a polymer and an inorganic coagulant, wherein the polymer is obtained by polymerizing a phenol, tannin, lignin and/or lignin sulfonate, with an aldehyde, melanin and/or urea.

As far as Applicants are aware, wastewater from petroleum production has not been clarified using condensed-type tannin, and the recovered oil recycled to the oil production.

SUMMARY OF THE INVENTION

Wastewater from a petroleum production field is rapidly clarified, and emulsified oil is recovered using a condensed-type tannin to break the emulsion. An optional inorganic coagulant can be used to agglomerate the released oil particles and an optional polymer flocculant can be used to enhance the efficiency of the clarifying process. The present process provides waste oil recycle and improves the environmental quality of the treated water. In addition, due to enhanced efficiency, the present process can obviate the need for large settling pits typically found in water treatment facilities.

As one embodiment, the present invention relates to a method for recovering oil and clarifying wastewater in an oil production field. As one step, production wastewater containing an oil-in-water emulsion is contacted with an aqueous de-emulsifying agent comprising tannin, an optional inorganic coagulant and optional polymer flocculant to form an oil phase and a water phase. The oil phase is separated from the water phase to recover de-emulsified oil. The de-emulsified oil is recycled to a produced oil stream. The tannin preferably comprises a condensed keto type plant tannin. Preferred condensed tannins comprise wattle or chestnut tannin. The tannin is preferably dosed at a concentration of from about 10 to about 200 ppm by weight in the wastewater. The coagulant is preferably an inorganic compound selected from water soluble salts of aluminum, iron and copper, and dosed at a concentration of from about 1 to about 100 ppm by weight in the wastewater. The flocculant can comprise a water soluble anionic or cationic polymer dosed at a concentration of from about 1 to about 100 ppm by weight in the waste water.

In a preferred embodiment, the contacting step comprises the sequential steps of adding the tannin and adding the coagulant. Sufficient residence time is allowed between the tannin and coagulant additions to destabilize the emulsion and increase the coagulation rate. The contacting step can also include the step of adding the flocculant following the coagulant addition step. Sufficient residence time is preferably allowed between the coagulant and flocculant addition to increase the flocculation rate. The oil recovery process can further comprise the step of recovering clarified water essentially free of oil.

As another embodiment, the present invention relates to an apparatus for recovering oil from wastewater in oil production. A holding tank is optionally provided to receive wastewater containing oil as an oil-in-water emulsion from the production equipment, preferably as the aqueous phase from an oil-water separator. Means are provided for mixing the oil-containing waste water with a de-emulsifying agent. A flotation tank is provided to receive the waste water/de-emulsifier mixture and form an oil phase and a water phase essentially free of oil. The de-emulsifying agent comprises a tannin for destabilizing the emulsion and producing oil particles, an optional inorganic coagulant for coagulating the oil particles and an optional flocculant for flocculating the coagulated particles. A recycle line is provided to draw off the oil phase from the flotation tank and feed the recovered oil to a produced oil stream.

BRIEF DESCRIPTION OF THE DRAWING

The FIGURE shows a schematic diagram of the oil recovery process and apparatus of the present invention.

DETAILED DESCRIPTION OF THE INVENTION

Wattle tannin is used to disrupt a stable oil-in-water emulsion formed in waste water from petroleum production and give a de-emulsified oil phase and a clarified water phase. Following phase separation in a flotation apparatus, the oil phase is recycled to a produced oil stream and the clarified water phase can be re-used or disposed of. Use of the present process introduces a cost effective method for extracting the dispersed oil from waste water while at the same time limiting adverse environmental impact from waste water disposal.

Referring to the FIGURE, a production field oil recycle and water clarifying process 10 of the present invention generally receives waste water from various primary sources. Depending on the field production capacity, each well and/or field A typically has an oil-water separator 11 wherein produced liquid is allowed to phase-separate. The oil phase is removed from the top of the separator 11 and usually pumped to a conventional holding tank 12 via line 14 for raw oil. The raw oil holding tank 12 can serve a plurality of wells operating in a plurality of production fields depending on the overall production capacity and will have an appropriate holding capacity.

Similarly, the water phase is withdrawn from the oil-water separator 11 via line 16. Lines 16$a$, 16$b$, 16$c$ represent lines from separator 11 and additional separators (not shown) for transferring oil-containing water into respective storage tanks 18$a$, 18$b$, 18$c$. Waste water from the on site storage tanks 18$a$, 18$b$, 18$c$ can be gathered and pumped through line 20 to a holding tank 22 for the oil-containing wastewater and then through line 24 to a separation vessel 26.

Upstream of the separation vessel 26, and preferably between the separation vessel 26 and the holding tank 22, the waste water is injected with an aqueous de-emulsifying agent to effect disruption of the oil-in-water emulsion. In addition, oil particles formed from the broken emulsion are preferably agglomerated so that phases of recovered oil and clarified water are produced in the separation vessel 26.

The present aqueous demulsifying agent comprises water soluble tannin. Tannin comprises astringent, aromatic acidic glucoside compounds found in various plants and trees. Tannin precipitates alkaloids, mercuric chloride, and heavy metal; forms blue-black ink with ferric solutions; and in strongly alkaline solutions rapidly absorbs oxygen. Tannin is classified according to its dry distillation products into two groups: condensed tannin, which yields catechol, and hydrolyzable tannin, which yields pyrogallol. Condensed type tannin has a high activity in the present invention at relatively low concentrations. Within the condensed tannins category, wattle tannin and chestnut tannin are particularly preferred. Wattle tannin, for example, is commercially extracted from the bark of *A. decurrens* (Mimosa tree). Chestnut tannin is commercially extracted from the chestnut tree. The tannin preferably has a weight average molecular weight ($M_w$) less than about 2000.

The tannin is preferably dosed at a concentration of from about 1 ppm to about 200 ppm depending on the surfactant concentration level in the waste water. High surfactant concentration, e.g. 8 to 10 percent by weight, can require a high tannin dosage—up to 100 ppm or more. A low tannin dosage (2 to 10 ppm) can be used when surfactant concentration in the water is relatively light (e.g. a few to about several thousand parts per million).

The demulsifying agent preferably includes an inorganic coagulant to hasten the coagulation of oil particles formed upon disruption of the emulsion by the tannin. Suitable inorganic coagulants include water soluble salts of iron, aluminum, copper, and the like.

Examples include ferrous chloride, ferric chloride, ferrous sulfate, ferric sulfate, alum, aluminum chloride, polyaluminum chloride, aluminum sulfate, cupric sulfate, and the like. The coagulant is preferably dosed at a concentration of from about 1 ppm to about 100 ppm by weight in the waste water.

The present demulsifying agent also preferably includes a synthetic or natural flocculant to hasten the agglomeration of smaller oil particles present as a discontinuous oil phase into a continuous oil phase to substantially free the aqueous phase from oil. The flocculant is preferably dosed at a concentration of from about 1 ppm to about 100 ppm by weight in the waste water. Use of the flocculant has been found to improve treatment performance (speed) to reduce the quantity of sludge produced. Exemplary synthetic flocculants are latexes of high molecular weight (greater than a million molecular weight) anionic or cationic, neutralized or quaternized polymers comprised of monomer species such as amines, acrylamides, acrylic acid, acrylates, acrylate salts, combinations thereof, and the like.

Specific representative examples of synthetic polymer flocculants include polyacrylamide, acrylamide/sodium acrylate copolymer, poly(sodium acrylate), poly(diallyldimethylammonium chloride) (polyDADMAC), poly(methacrylamidopropyltrimethylammonium chloride) (polyMAPTAC), poly(N,N-dimethylaminoethylmethacrylate), poly(2-hydroxypropyl-1,1-N-dimethylammonium chloride), poly(ethyleneamine), poly(2-hydroxypropyl-1-N-methylammonium chloride), quaternized salt of ammonia-ethylene dichloride condensation polymers, and the like.

Specific representative examples of natural polymer flocculants include a water soluble polysaccharide such as guar gum; and protein colloids such as gelatin or animal glue.

The demulsifying agent is injected into the wastewater to disrupt the emulsion and agglomerate oil particles. Active components of the de-emulsifying agent are preferably injected step-wise with the tannin added first, followed by any coagulant and then any flocculant, allowing sufficient residence time between the additions to mix and disrupt the emulsion prior to particle agglomeration, and allowing sufficient time for the size of the oil particles to increase prior to the flocculation thereof. Residence time between the addition of the tannin breaker to the addition of a coagulant is preferably at least about 15 seconds and more preferably from about 30 seconds to about 5 minutes. Residence time between the addition of the coagulant to addition of a flocculant is preferably at least about 15 seconds and more preferably from about 30 seconds to about 5 minutes.

While any kind of separation vessel for separating the oil and water phases can be used, a flotation unit has been found to be particularly suitable. Flotation is a well known process combining strong agitation and aeration which is based on surface wettability, especially the affinity of a hydrophobic particle surface for the surface an air bubble. In the present flotation process, lighter particles such as particles of oil adhere to bubbles rising through the agitated water to concentrate as an oily foam at the top of the vessel.

The foam oil phase removed from the flotation vessel 26 is preferably recycled through line 28 to the raw oil holding tank 12. Alternatively, the recycled oil from the flotation vessel 26 can be burned as fuel. The clarified water phase is removed from the flotation vessel 26 through line 30 for reinjection or disposal. The clarified water in line 30 has a sufficiently low concentration of residual oil to permit environmentally safe disposal, preferably less than about 30 ppm.

The raw oil can be dehydrated in a conventional manner. Raw oil is withdrawn from the holding tank 12 through line 31 and passed to a drying zone comprising, for example, a pair of parallel dehydration heaters 32a, 32b. Dehydrated oil is directed through line 34 to a clean oil holding tank 36. Residual water removed from the oil is recycled through line 38 back to the wastewater holding tank 22 for additional oil extraction. Dehydrated product oil is withdrawn from the holding tank 12 through line 40.

Wastewater treated according to the present invention generally comprises an oil substantially as an oil-in-water emulsion which is stabilized by the presence of one or more different surfactants. The wastewater can contain various types of oils including petroleum-based oils such as crude petroleum and refined oils such as fuel, mineral and lubricating oils; fixed oils such as animal fats and vegetable oils; and the like. Besides oil and surfactants, the wastewater can also contain various residual components and application byproducts including metal ions and particles, corrosion inhibitors, water-in-oil breakers, electrolytes, stabilizers, biocides, thickeners, dyes, scavengers, pH adjusters, softeners, etc. The oil concentration will typically be a few parts per million up to 10–15 weight percent. The surfactant concentration can sometimes be up to 10 weight percent but will usually average from about 3 to 5 weight percent. The wastewater pH is generally between about 5 and about 9.

The present chemical treatment agents are preferably used as aqueous concentrates for convenience. The tannin emulsion breaker can be supplied commercially as an aqueous solution at from about 15 to about 50 percent by weight active tannin. The inorganic coagulant is used as an aqueous solution at 5 to 20 percent by weight active coagulant, and the polymer flocculant is used as a latex at 5 to about 35 percent by weight active flocculant.

The tannin concentrate preferably includes a biocide agent suitable for preventing bacterial degradation. Since tannin is biodegradable and an attractive substrate for bacterial growth, the biocide can extend the shelf-life of the tannin concentrate. Examples of suitable biocides include glutaraldehyde, quaternary ammonium compounds such as benzalkonium chloride and cetylpyridinium chloride, phenolics such as pentachlorophenol, bromine compounds such as 2,2-dibromo-2-cyanoacetamide, and the like.

Although the present process is directed to oil recovery from oil production waste water, it can be seen that such a method could be used for oil recovery from any type of waste water containing emulsified oil such as the waste water from petrochemical manufacturing, food processing, mining, metal plating, metallurgical operations, laundries, and the like.

The present invention can be further illustrated by reference to the following examples:

EXAMPLES 1–11 AND COMPARATIVE EXAMPLES 1–21

Process upgrading at a water clarification and oil dehydration facility of an oilfield gathering station reduced the time available to separate dispersed oil particles from the produced water. Previously, the station had employed a large open settling pit. This pit had been discontinued and replaced by a compact dispersed gas flotation unit available under the trade designation Unicell. Therefore, in order to meet a water quality target of 30 ppm oil or less in the treated water, tests were run to screen various de-emulsifying agents which could hasten separation of the emulsified oil. The gathering facility received production wastewater from three different fields as well as rapid periodic slugs of water, approximately 2000 barrels in size, used to clean production pipelines. The facility had a capacity of 2500 barrels and the water contained both high gravity crude oil as well as lighter oil condensate from produced gas. In addition, the produced wastewater contained corrosion inhibitor additives which had the effect of stabilizing the oil-in-water dispersions. Also, the clean-up water probably contained surfactants.

To screen various materials and determine optimum concentration, samples of water were treated in a portable bench gas flotation unit obtained under the trade designation Wemco which simulated the vigorous agitation and foaming characteristics of full size water clarification equipment. As testing progressed, agitation and aeration were adjusted to better simulate the produced water tank/Unicell unit operating conditions. The best system simulation was obtained by mixing the coagulant for one minute at 300 rpm with no aeration, and then for one minute with aeration at 800 rpm. If a flocculant was used, it was added one minute after the coagulant. Following treatment, a sample from the Wemco unit was evaluated on a scale from 1 to 10 for clarity of the water and stability of the floc formed with 1 being the worst (no treatment) and 10 being the best (clear water and strong, stable floc).

The screening procedure employed the following steps: A 7-18 liter sample of the produced water was withdrawn. The bowl of the Wemco unit was filled to the 2500 mL mark. One weight percent solutions of materials to be tested were made up, and an appropriate dosage of the selected additive was added to the bowl by syringe or pipette. The agents screened are listed in Table 1. Additions of the tannin, coagulant and flocculant (if any) were made one minute apart with the tannin added first under normal agitation and aeration (1800 rpm). After one minute, the coagulant was added, the speed was reduced to 300 rpm and the aeration was halted. After another minute, the flocculant (if any) was added, the speed was increased to 800 rpm and the aeration was resumed. During the final agitation procedure, the ability of the oil to remain on top of the foam (instead of being mixed back into the water) was observed. The agitator was turned off, and following a 10 second delay to let the foam break, a 100 mL sample of water from the surface was removed using a pipette or syringe and placed in a 175 mL clear bottle for observation. Bottles were visually graded, and the Wemco unit was cleaned and dried for the next test. To assist sample comparisons, a phototester was periodically used. To obtain a precise determination of residual oil content, solvent extractions were periodically done as described in EPA Method 413.2 for Freon extraction.

TABLE 1

| Component | Description |
| --- | --- |
| A | 22 wt % wattle tannin solution |
| B | Sodium Hypochlorite |
| C | Aniline-formaldehyde condensate polymer |
| D | Sodium acrylate/acrylamide 20/80 polymer latex 29% active |
| E | 12.2 wt % Poly Al(Cl)$_3$ 2.5 wt % Epichlorohydrin/Dimethylamine copolymer |
| F | 17.5 wt % Poly Al(Cl)$_3$ 2.5 wt % Epichlorohydrin/Dimethylamine copolymer |
| G | DMAEM.H$_2$SO$_4$ High M$_w$ latex, 28.5 % active |
| H | Acrylamide/NaAMPS latex |
| I | Methacrylic acid/ethylacrylate copolymer latex |

It was observed that results were enhanced by staggering the addition of the de-emulsifying components: The dispersion breaker (tannin) was added first to effect destabilization prior to addition of the coagulant and/or flocculant. When both coagulant and flocculant were used, oil agglomeration was enhanced by allowing a small amount of contact time before addition of the flocculant. In addition, use of the flocculant further improved clarification efficiency by hastening the building of

TABLE 2

| | Concentration (ppm) | | | | | | | | | Mixing Parameters | | | |
| | Breaker | | | Coagulant | | | Flocculant | | | Time$^{a,b}$ | | | |
| Ex. | A | B | C | D | E | F | G | H | I | (min.) | RPM | Eval. | Comments |
| --- | --- | --- | --- | --- | --- | --- | --- | --- | --- | --- | --- | --- | --- |
| Comp. 1 | | 300 | | 3 | | | | | | 2 | 650 | 10 | Excellent clarity; heavy orange floc. |
| Comp. 2 | | | 3 | 3 | | | | | | 2 | 650 | 2 | |
| Comp. 3 | | | 6 | 3 | | | | | | 2 | 650 | 3 | |
| 1 | 15 | | | 3 | | | | | | 2 | 650 | 2 | |
| 2 | 15 | | | 6 | | | | | | 2 | 650 | 3 | |
| Comp. 4 | | | | 3 | | | | | | 2 | 650 | 3 | Water clarity improves with |
| Comp. 5 | | | | 6 | | | | | | 2 | 650 | 5 | increase in D dosage. |
| Comp. 6 | | | | 9 | | | | | | 2 | 650 | 7 | |
| Comp. 7 | | | | 6 | | | 15 | | | 2 | 650 | 3 | |
| Comp. 8 | | 300 | | 3 | | | | | | 2 | 650 | 5 | |
| Comp. 9 | | 300 | | 6 | | | | | | 2 | 650 | 7 | |
| Comp. 10 | | 300 | | 6 | | | | | | 1 | 800 | 8 | Clarity lower with reduced B |
| Comp. 11 | | 20 | | 6 | | | | | | 1 | 800 | 6 | concentration. |
| Comp. 12 | | | | | | | | | 20 | 1 | 800 | 5 | Oil floating but small floc. |
| Comp. 13 | | | | | | | | | 40 | 1 | 800 | 6 | Better but floc not holding. |
| Comp. 14 | | 60 | | 9 | | | | | | 1 | 800 | 7 | Still best so far. |
| Comp. 15 | | | | 9 | | | 60 | | | 1 | 800 | — | Gives floc but water still appears to |
| Comp. 16 | | | 40 | 6 | | | 20 | | | 1 | 800 | — | contain too much stabilized oil. |
| 3 | 120 | | | | | | | | 3 | 1/1 | 300/800 | 6 | Floc too loose. |
| 4 | 120 | | | | | | | | 6 | 1/1 | 300/800 | 8 | Much better floc. |
| 5 | 120 | 20 | | | | | | | 9 | 1/1 | 300/800 | — | B or air bubbles needed to pretreat |

TABLE 2-continued

| | Concentration (ppm) | | | | | | | | | Mixing Parameters | | | |
|---|---|---|---|---|---|---|---|---|---|---|---|---|---|
| | Breaker | | | Coagulant | | | Flocculant | | | Time[a,b] | | | |
| Ex. | A | B | C | D | E | F | G | H | I | (min.) | RPM | Eval. | Comments |
| | | | | | | | | | | | | | contaminents before G. |
| 6 | 200 | | | | | | 3 | | | 1/1 | 300/800 | 6 | Floc not holding together. |
| 7 | 200 | | | | | | 6 | | | 1/1 | 300/800 | 8 | Floc much better. |
| Comp. 17 | | | | 100 | | | 6 | | | 1/1 | 300/800 | 3 | Poor floc. |
| Comp. 18 | | | | | 100 | | 6 | | | 1/1 | 300/800 | 3 | Poor floc. |
| 8 | 100 | | | | | | 6 | | | 1/1 | 300/800 | 8 | Excellent. Oil <30 ppm. |
| 9 | 100 | | | | | | | 20 | | 1/1 | 300/800 | 3 | Poor |
| 10 | 100 | | | | | | 6 | 20 | | 1/1 | 300/800 | 7 | Good but not as good as Ex. 8. |
| 11 | 100 | | | 6 | | | | | | 1/1 | 300/800 | 8 | Excellent. Oil <30 ppm. |

[a]Mixing time between components.
[b]One minute mixing time no air/reduced speed; one minute mixing time with air/increased speed.

particle size. Results of the screening tests are presented in the Table 2.

It can be observed that the present wattle tannin emulsion breaker dosed at a concentration of about 100 ppm and used in conjunction with a polymer flocculant dosed at a concentration of about 6 ppm (as seen in Example 8) or an inorganic coagulant dosed at a concentration of about 6 ppm (as seen in Example 11) gave excellent demulsification in the Unicell with the resulting clarified water having a residual oil concentration less than 30 ppm. It is expected that performance of the present process with regard to rapidity of waste water clarification can be enhanced by employing the polymer flocculant and inorganic coagulant together in the process.

The present oil recycle process is illustrated by way of the foregoing description and examples. The foregoing description is intended as a non-limiting illustration, since many variations will become apparent to those skilled in the art in view thereof. It is intended that all such variations within the scope and spirit of the appended claims be embraced thereby.

We claim:

1. A method for recovering oil from production wastewater, comprising the steps of:
   producing a mixture of oil and water from a well;
   separating the produced mixture to form a crude oil product, and a wastewater product containing an oil-in-water emulsion stabilized by the presence of surfactants;
   contacting the wastewater product with an aqueous de-emulsifying agent comprising water soluble condensed-type tannin having a molecular weight of less than about 2,000, an optional coagulant and an optional polymer flocculant to form an oil phase and a clarified water phase;
   separating the oil and water phases to recover demulsified oil and clarified wastewater; and
   recycling the de-emulsified oil to the crude oil product.

2. The method of 1, wherein the condensed tannin comprises wattle or chestnut tannin.

3. The method of claim 1, wherein the tannin is dosed at a concentration of from about 10 to about 200 ppm in the wastewater product.

4. The method of claim 1, wherein the coagulant is an inorganic compound selected from water soluble salts of Aluminum, Iron and Copper, and dosed at a concentration of from about 1 to about 100 ppm in the wastewater product.

5. The method of claim 1, wherein the flocculant comprises a water soluble anionic or cationic polymer dosed at a concentration of from about 1 to about 100 ppm in the wastewater product.

6. The method of claim 1, wherein the contacting step comprises the sequential steps of adding the tannin followed by adding the coagulant to the wastewater product.

7. The method of claim 6, comprising allowing sufficient time between the tannin addition and the coagulant addition to destabilize the emulsion and increase the coagulation rate.

8. The method of claim 7, including the step of flocculating the coagulated oil particles by addition of the flocculant following the coagulating step with a sufficient residence time therebetween to enhance the effectiveness of the flocculant.

9. The method of claim 1, wherein the clarified waste water contains less than about 30 ppm oil.

10. A method for recovering oil from production wastewater, comprising the steps of:
   a. producing a mixture of oil and water from a well;
   b. separating the produced mixture to form a crude oil product, and a wastewater product containing an oil-in-water emulsion stabilized by the presence of surfactants;
   c. contacting the wastewater product with an aqueous de-emulsifying agent comprising a water soluble condensed tannin having a molecular weight of less than about 2,000 followed by an effective amount of an optional water soluble coagulant followed by an effective amount of a polymeric flocculant from the group consisting of polyacrylamide, copolymers of acrylamide and sodium acrylate, poly(sodium acrylate), polydiallyldimethylammonium chloride, polymethacrylamidopropyltrimethylammonium chloride, poly (N,N-dimethylaminoethylmethacrylate, poly (2-hydroxypropyl-1,1-N-dimethylammonium chloride, polyethyleneamine), poly(2-hydroxypropyl-1-N-methylammonium chloride, quaternized salt of ammonia-ethylene dichloride, copolymers of methacrylic acid and ethlyacrylate, to form an oil phase and a clarified water phase;
   d. separating the oil and water phases to recover demulsified oil and clarified wastewater; and
   e. recycling the de-emulsified oil to the crude oil product.

11. The method of claim 10, wherein the condensed tannin comprises wattle tannin or chestnut tannin.

12. The method of claim 10, wherein the tannin is dosed at a concentration of from about 10 to about 200 ppm in the wastewater product.

13. The method of claim 10, wherein the coagulant is an inorganic compound selected from water soluble salts of aluminum, iron and copper, and dosed at a concentration of from about 1 to 100 ppm in the wastewater product.

14. The method claim 10, comprising allowing sufficient time between the tannin addition and the coagulant addition to destabilize the emulsion and increase the coagulation rate.

15. The method of claim 10, including the step of flocculating the coagulated oil particles by addition of the flocculant following the coagulating step with a sufficient residence time therebetween to enhance the effectiveness of the flocculant.

16. The method of claim 10, wherein the clarified wastewater contains less than about 30 ppm oil.

* * * * *